(12) United States Patent
Faaborg et al.

(10) Patent No.: US 9,243,921 B2
(45) Date of Patent: Jan. 26, 2016

(54) INTUITIVE PREVIEW OF UPCOMING NAVIGATIONAL INSTRUCTIONS

(71) Applicant: Google Inc., Mountain View, CA (US)

(72) Inventors: Alexander James Faaborg, Mountain View, CA (US); Joshua Robin Kaplan, San Francisco, CA (US)

(73) Assignee: Google Inc., Mountain View, CA (US)

( * ) Notice: Subject to any disclaimer, the term of this patent is extended or adjusted under 35 U.S.C. 154(b) by 27 days.

(21) Appl. No.: 14/267,235

(22) Filed: May 1, 2014

(65) Prior Publication Data

US 2015/0233722 A1 Aug. 20, 2015

Related U.S. Application Data

(60) Provisional application No. 61/941,116, filed on Feb. 18, 2014.

(51) Int. Cl.
*G08G 1/123* (2006.01)
*G01C 21/34* (2006.01)
(Continued)

(52) U.S. Cl.
CPC ............ *G01C 21/34* (2013.01); *G01C 21/3632* (2013.01); *G01C 21/3655* (2013.01); *G06K 15/1843* (2013.01); *G08G 1/096861* (2013.01); *G09B 29/003* (2013.01)

(58) Field of Classification Search
CPC ............... G01C 21/00; G01C 21/3632; G06K 15/1843; G08G 1/096861
USPC ......................... 340/995.27; 358/1.2; 701/431
See application file for complete search history.

(56) References Cited

U.S. PATENT DOCUMENTS

| 5,654,892 A | 8/1997 | Fujii et al. |
| 6,397,145 B1 | 5/2002 | Millington |

(Continued)

FOREIGN PATENT DOCUMENTS

| EP | 0 892 248 B1 | 12/2004 |
| EP | 1 541 969 A1 | 6/2005 |

(Continued)

OTHER PUBLICATIONS

International Search Report from PCT/US2015/016292, mailed May 26, 2015, 3 pages.

(Continued)

*Primary Examiner* — John A Tweel, Jr.
(74) *Attorney, Agent, or Firm* — Dority & Manning, P.A.

(57) ABSTRACT

Systems and methods for providing an intuitive preview of upcoming navigational instructions are provided. One example method for providing navigational instruction includes obtaining, by one or more computing devices, navigational information describing a sequence of navigational maneuvers associated with a route. The method includes determining, by the one or more computing devices, a distance between each navigational maneuver and the previous sequential navigational maneuver. The method includes displaying, by the one or more computing devices, a user interface providing a sequence of indicators respectively representing the sequence of navigational maneuvers. A space between each indicator and the previous sequential indicator is proportional to the distance between the navigational maneuver represented by such indicator and the navigational maneuver represented by the previous sequential indicator.

20 Claims, 4 Drawing Sheets

(51) Int. Cl.
   *G09B 29/00* (2006.01)
   *G08G 1/0968* (2006.01)
   *G06K 15/02* (2006.01)
   *G01C 21/36* (2006.01)

(56) References Cited

U.S. PATENT DOCUMENTS

| | | | |
|---|---|---|---|
| 6,728,630 B1 | 4/2004 | Burt et al. | |
| 7,321,824 B1 | 1/2008 | Nesbitt | |
| 8,260,550 B2 | 9/2012 | Highstrom et al. | |
| 8,700,331 B2* | 4/2014 | Moore et al. | 701/533 |
| 2009/0171575 A1* | 7/2009 | Kim et al. | 701/209 |
| 2012/0150436 A1 | 6/2012 | Rossano et al. | |
| 2013/0103314 A1 | 4/2013 | Moore et al. | |
| 2014/0313525 A1* | 10/2014 | Moore et al. | 358/1.2 |

FOREIGN PATENT DOCUMENTS

| | | |
|---|---|---|
| EP | 2 075 544 | 7/2009 |
| WO | WO 2012/167154 | 12/2012 |

OTHER PUBLICATIONS

Magellan Maestro 4040 Review, GPS Magazine, www.gpsmagazine.com2007/04/review_magellan_maestro_4040, Apr. 9, 2007, 7 pages.

Smith, Mat, "Nokia Transit makes the commute over to Asha touchscreen phones, adds public transport info", www.engadget.com. Mar. 26, 2013, 3 pages.

* cited by examiner

INTUITIVE PREVIEW OF UPCOMING NAVIGATIONAL INSTRUCTIONS

PRIORITY CLAIM

The present application claims the benefit of priority of U.S. Provisional Patent Application Ser. No. 61/941,116, titled Intuitive Preview of Upcoming Navigational Instructions, filed Feb. 18, 2014, which is incorporated herein by reference for all purposes.

FIELD

The present disclosure relates generally to navigational systems. In particular, the present disclosure is directed to systems and methods for providing an intuitive preview of upcoming navigational instructions.

BACKGROUND

Navigational devices are becoming increasingly commonplace in the modern world. For example, navigational devices can be used for navigating a vehicle such as a car, boat, or airplane or for use when walking through an unfamiliar location.

Furthermore, as smartphones, tablets, or other computing devices become increasingly able to determine their own position in the world using GPS or other positioning systems, navigational devices are no longer limited to devices specifically designed with the sole-purpose of providing navigational instructions. Instead, navigational devices can include a large variety of computing devices capable of implementing one or more applications to provide near-instantaneous instructions for navigating from almost any location to any other location.

In particular, such applications often offer "turn-by-turn" navigational instruction, which provides navigation over a sequence of navigational maneuvers (e.g. driving maneuvers such as "turn right"). As an example, the sequence of maneuvers can be described by a group of textual entries that respectively describe the upcoming maneuvers. As other examples, the navigational device can provide a group of graphical icons that respectively represent the upcoming maneuvers or can output audio in the form of human speech that describes the upcoming maneuvers.

However, certain display methods implemented by current navigational devices can fail to provide users with an intuitive, user-friendly sense of the scale and relationship between the upcoming maneuvers. As an example, the navigational device may fail to indicate the distance between upcoming maneuvers or may provide the navigational instruction only upon approaching a predefined distance from the maneuver location.

However, if there are two maneuvers within relative proximity to one another, the navigation device may fail to provide sufficient advanced warning to enable the user to be in proper position or otherwise appropriately anticipate the maneuver. For example, a driver may be required to merge or change lanes immediately after a first maneuver in order to be in position to make a second maneuver. As such, if the navigational device fails to the give the driver appropriate notice, then the driver may miss the second maneuver.

As another example, in the instance that the navigational device provides the distance between upcoming maneuvers in a textual format, the user may struggle to mentally convert the textual distance information into a full comprehension of the physical distance. Alternatively, user effort to comprehend textual distances or time spent looking at the device display to read the text can undesirably distract the user from the navigational activity (e.g. driving the car).

SUMMARY

Aspects and advantages of the present disclosure will be set forth in part in the following description, or may be obvious from the description, or may be learned through practice of embodiments of the present disclosure.

One example aspect of the present disclosure is directed to a method for providing navigational instruction. The method includes obtaining, by one or more computing devices, navigational information describing a sequence of navigational maneuvers associated with a route. The method includes determining, by the one or more computing devices, a distance between each navigational maneuver and the previous sequential navigational maneuver. The method includes displaying, by the one or more computing devices, a user interface providing a sequence of indicators respectively representing the sequence of navigational maneuvers. A space between each indicator and the previous sequential indicator is proportional to the distance between the navigational maneuver represented by such indicator and the navigational maneuver represented by the previous sequential indicator.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling description of the present disclosure, directed to one of ordinary skill in the art, is set forth in the specification, which makes reference to the appended figures, in which.

DETAILED DESCRIPTION

Figure 1:
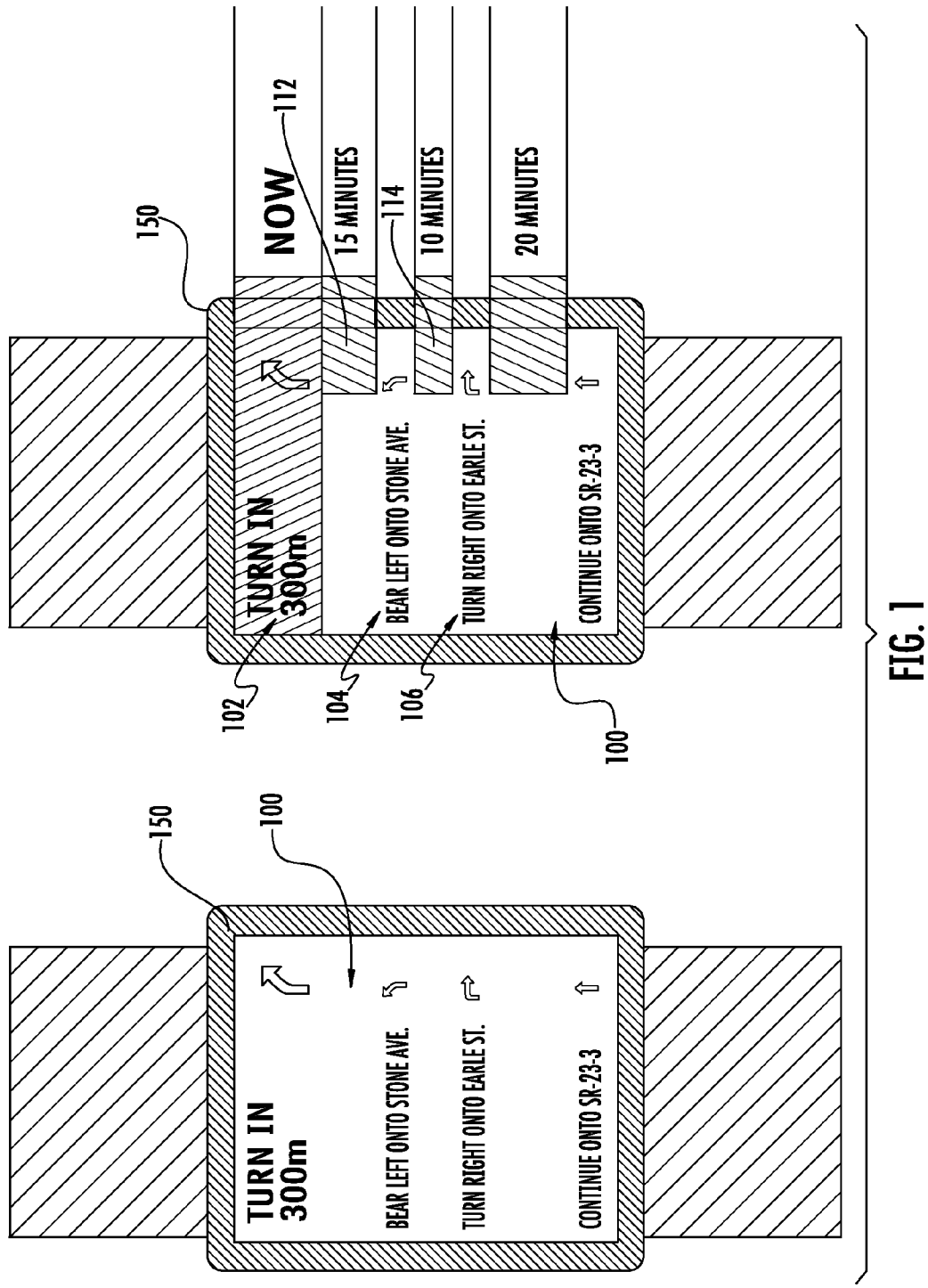
FIG. 1 depicts an example user interface according to an example embodiment of the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made to the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Generally, the present disclosure is directed to systems and methods for providing an intuitive preview of upcoming navigational instructions. In particular, a navigational device can obtain navigational information describing a sequence of navigational maneuvers associated with a route. The device can display a user interface that provides a sequence of indicators that respectively represent the sequence of navigational maneuvers. As an example, the device can determine its current location and then identify one or more maneuvers that should occur within a given timeframe. A space can be provided between each pair of adjacent indicators on the user interface. In particular, the space between each indicator and the previous sequential indicator can be proportional to a distance between the navigational maneuver represented by such indicator and the navigational maneuver represented by the previous sequential indicator. In such fashion, the user of the navigational device can be provided with an intuitive visual sense of the spatial and/or temporal relationship between upcoming navigational maneuvers.

More particularly, a navigational device implementing the present disclosure can obtain navigational information describing a route from an origin to a destination. For example, the navigational device can communicate with a server over a network to obtain the navigational information.

The route can include a sequence of navigational maneuvers. For example, navigational maneuvers can include driving or walking maneuvers such as "turn right", transit maneuvers such as "board the southbound L-Train", or other suitable forms of navigational maneuvers.

A distance can exist between each pair of sequential navigational maneuvers. For example, the distance can be a physical distance between the locations respectively associated with the pair of navigational maneuvers. As another example, the distance can be a driving distance (e.g. the distance that a car must travel along one or more roadways).

As yet another example, the distance between each pair of navigational maneuvers can be a travel time such as, for example, an average travel time between the locations respectively associated with the pair of navigational maneuvers. As another example, the distance between each pair of navigational maneuvers can be a current expected travel time that incorporates real-time information concerning traffic conditions, weather conditions, current device speed, or other factors.

According to an aspect of the present disclosure, the navigational device can identify one or more upcoming maneuvers for display in the user interface. As an example, in some implementations, the navigational device can determine the current position of the device or device user. Based on such current position, the navigational device can identify one or more upcoming maneuvers. For example, the device can identify the next three upcoming maneuvers.

As another example, in some implementations, the navigational device can identify both the current position and speed of the device or device user. Based on such information, the device can determine which of the sequence of navigational maneuvers the user is expected to reach within a threshold amount of time.

As yet another example, the navigational device can simply display upcoming maneuvers received from a server. In particular, the device can report its current location and/or speed to the server and the server can, in turn, provide the navigational device with data identifying the upcoming maneuvers. For example, the data from the server can identify a plurality of upcoming maneuvers and a plurality of distances respectively associated with the upcoming maneuvers and the navigational device can use such information to determine the appropriate presentation of the upcoming maneuvers.

As another example, in some implementations, the data from the server can include a listing of upcoming maneuvers and associated distances or spacings along with a style sheet. The device can then apply the style sheet to the provided listing. As yet another example, the server can provide the navigational device with a web page or other data structure in which the upcoming maneuvers are already organized (e.g. spaced according to distance) for display.

The navigational device can then indicate the identified maneuvers to the user via a user interface. In particular, the device can provide a sequence of indicators in the user interface that respectively represent the identified upcoming navigational maneuvers. As an example, the indicators can be textual entries that describe the upcoming maneuvers using text. As another example, the indicators can be graphical icons such as, for example, a graphical arrow showing a right turn.

In some implementations of the present disclosure, the indicators can be displayed at different positions along a first axis of the user interface that is representative of distance (e.g. physical distance, travel time, current expected travel time, etc.). For example, the first axis can be the y-axis of the user interface.

In particular, an interval or space can be provided between each pair of adjacent indicators displayed along the first axis. The interval between each pair of adjacent indicators can be proportional to the distance between the pair of maneuvers such pair of indicators represent.

The user interface can be updated on a periodic basis to reflect the user's progress along the route. For example, in some implementations, the navigational device can determine when a navigational maneuver has been performed and remove the corresponding indicator from the user interface.

As another example, the device can periodically determine its position relative to the route and update the user interface accordingly. For example, in some implementations, the device can scroll the displayed indicators along the distance axis as the user progresses along the route (e.g. scrolled upwards when the indicators are presented along the y-axis with the next maneuver shown at the top).

As yet another example, the navigational device can periodically communicate with a server to receive additional information, refresh a web page, or otherwise update the display of upcoming maneuvers.

According to another aspect of the present disclosure, indicators representing maneuvers that the user is newly approaching can be presented in a fashion which visually simulates the indicator moving onto the bottom of the display area from previously being below the display area and out of sight. In such fashion, the user can be given the impression that the device display area is virtually scrolling through the entire sequence of indicators so as to display only the most relevant upcoming indicators.

In further embodiments of the present disclosure, the navigational device can determine a scale of the distance axis of the user interface based on a current speed at which the device or the device user is travelling. For example, the scale of the distance axis can decrease (e.g. show a smaller amount of distance over the same display space) when the speed is smaller and increase (e.g. show a larger amount of distance over the same display space) when the speed is greater.

In particular, the navigational device can periodically adjust the scale of the distance axis based on the current speed of the device or the device user. The device can then determine which upcoming maneuvers should be indicated in the user interface display area based on the scale of the distance axis and the respective distances associated with the upcoming maneuvers. The identified maneuvers can then be respectively represented by a sequence of indicators at corresponding positions along the distance axis.

As another example, determinations regarding the scale of the distance axis can be performed at a server and then communicated to the navigational device. The navigational device can then update the display according to the most recent information received from the server.

Thus, the systems and method of the present disclosure can assist in providing an intuitive preview of upcoming navigational instructions. In particular, a space between each indicator displayed in a user interface and a previous sequential indicator can be proportional to a distance between the navigational maneuver represented by such indicator and the navigational maneuver represented by the previous sequential indicator. In such fashion, the user of the navigational device can be provided with an intuitive visual sense of the spatial and/or temporal relationship between upcoming navigational maneuvers.

With reference now to the FIGS., example embodiments of the present disclosure will be discussed in further detail. FIG. 1 depicts an example user interface 100 according to an example embodiment of the present disclosure. In particular, user interface 100 is shown as provided on the display of a navigational device 150 (e.g. a smartwatch).

Provided in user interface 100 are a plurality of indicators, such as, for example, indicators 102, 104, and 106. Each indicator can represent an upcoming navigational maneuver. Each indicator can include a textual entry (e.g. "Bear Left Onto Stone Ave.") and/or a graphical icon (e.g. an arrow showing a leftwards turn).

The plurality of indicators can be ordered into a sequence based on the expected order in which they should be performed. For example, as shown in FIG. 1, the plurality of indicators can be presented at different positions along a y-axis of interface 100.

As an example, as shown in FIG. 1, the indicator 102 for the next upcoming maneuver can be shown in a larger font/icon size at the top of the display area. For example, a particular color or other spatial designations can be used to highlight the next upcoming indicator.

According to an aspect of the present disclosure, a space can be provided between each pair of adjacent indicators. For example, space 112 is provided between indicators 102 and 104 while space 114 is provided between indicators 104 and 106.

The space between each pair of adjacent indicators can be proportional to the distance between the pair of maneuvers such pair of indicators represent. For example, as shown in FIG. 1, space 112 which corresponds to a distance of 15 minutes is larger than space 114 which corresponds to a distance of 10 minutes.

Further, while FIG. 1 shows spaces 112 and 114 as based on distance in terms of a travel time, other suitable measures of distance can be used. For example, the distance can be a physical distance between the locations respectively associated with the pair of navigational maneuvers; a driving distance (e.g. the distance that a car must travel along one or more roadways); a travel time such as, for example, an average travel time between the locations respectively associated with the pair of navigational maneuvers; or a current expected travel time that incorporates real-time information concerning traffic conditions, weather conditions, current device speed, or other factors.

In addition, it will be understood that user interface 100 is provided as an example. User interfaces implementing the present disclosure may include many other various colors, patterns, divisions of space, fonts, icons, or other visual characteristics that are different than those shown in FIG. 1.

Thus, user interface 100 provides an intuitive preview of upcoming navigational instructions. In particular, a space between each indicator displayed in user interface 100 and a previous sequential indicator can be proportional to a distance between the navigational maneuver represented by such indicator and the navigational maneuver represented by the previous sequential indicator. In such fashion, the user of the navigational device can be provided with an intuitive visual sense of the spatial and/or temporal relationship between upcoming navigational maneuvers.

Figure 2:
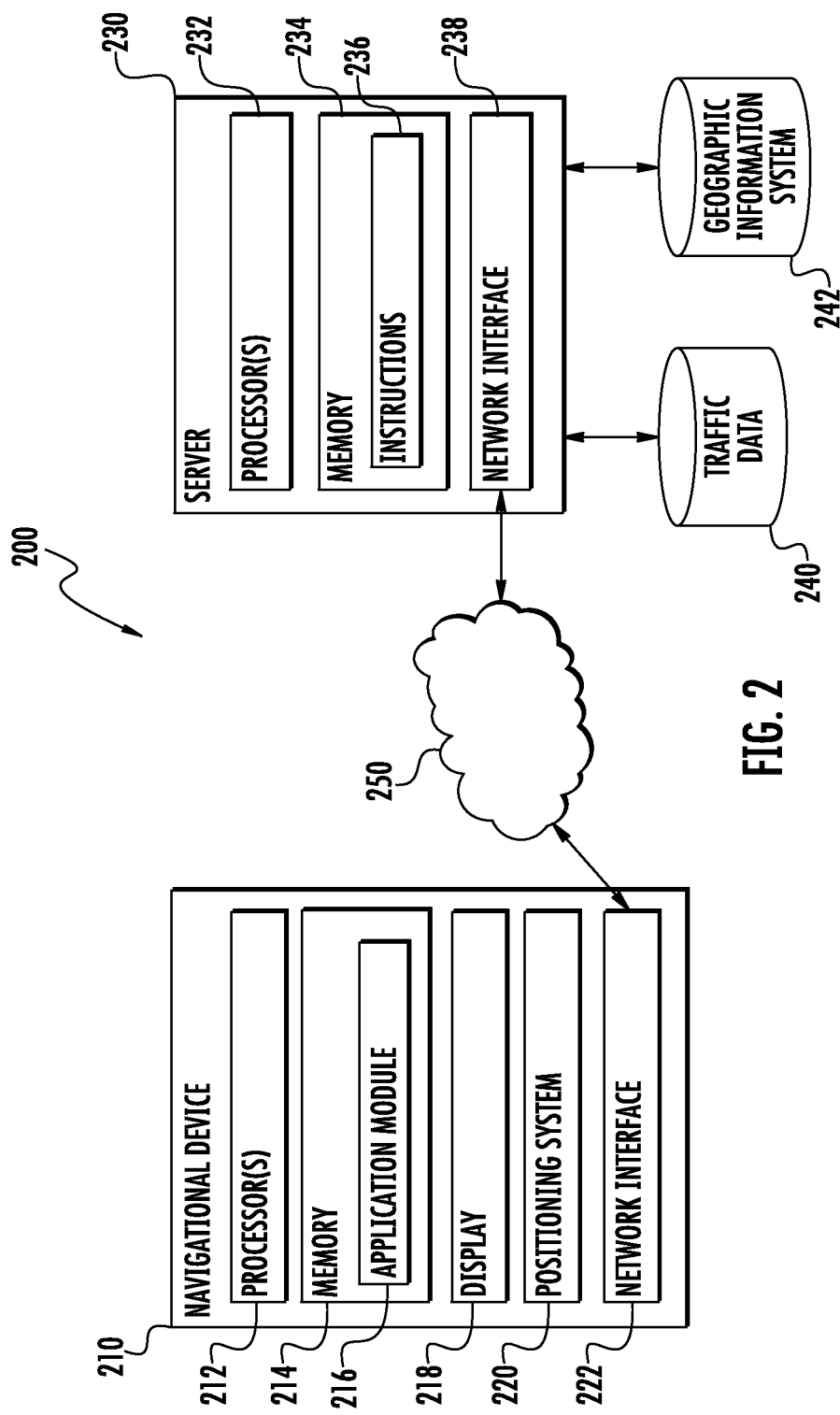
FIG. 2 depicts an example navigational system according to an example embodiment of the present disclosure.

FIG. 2 depicts an example navigational system 200 according to an example embodiment of the present disclosure. Navigational system 200 includes a navigational device 210 in communication with a server 230 over a network 250. Although a single navigational device 210 is depicted, navigational system 200 can include a client-server architecture in which any number of navigational devices can be connected to server 230 over network 250.

Navigational device 210 can be any suitable device used for navigation, including a sole-purpose navigational device, a smartphone, a tablet, a laptop, a PDA, a device installed within a dashboard of a vehicle, a heads up display in a vehicle, a wearable computing device (e.g. eyeglasses containing one or more embedded computing devices), or any other device that is configured to display navigational instructions. Navigational device 210 can include one or more processor(s) 212, a memory 214, a display 218, a positioning system 220, and a network interface 222.

The processor(s) 212 can be any suitable processing device, such as a microprocessor, microcontroller, integrated circuit, or other suitable processing device. The memory 214 can include any suitable computing system or media, including, but not limited to, non-transitory computer-readable media, RAM, ROM, hard drives, flash drives, or other memory devices. The memory 214 can store information accessible by processor(s) 212, including instructions that can be executed by processor(s) 212. The instructions can be any set of instructions that when executed by the processor(s) 212, cause the processor(s) 212 to provide desired functionality.

In particular, in some devices, memory 214 can store an application module 216. Navigational device 210 can implement application module 216 to execute aspects of the present disclosure, including directing communications with server 230 and providing navigational instructions to a user (e.g. generating and/or displaying a navigational user interface).

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media.

Memory 214 can also include data, such as geographic data, that can be retrieved, manipulated, created, or stored by processor(s) 212. In some implementations, such data can be accessed and used to generate maps and navigational instructions.

The navigational device 210 can also include a positioning system 220 that can be used to identify the position of the navigational device 210. The positioning system 220 can be any device or circuitry for monitoring the position, speed, and/or heading of the navigational device 210. For example, the positioning system 220 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a magnetic field positioning system, a dead reckoning system, based on IP address, by using triangulation and/or proximity to cellular towers or WiFi hotspots, and/or other suitable techniques for determining position.

The navigational device 210 can include various input/output devices for providing and receiving information from a user, such as a touch screen, touch pad, data entry keys, speakers, mouse, and/or a microphone suitable for voice recognition. For instance, the navigational device 210 can use display 218 to present information to the user, including textual or graphical navigational instructions Network interface 222 can be any suitable device or circuitry for providing communications across network 250. For example, network interface 222 can include one or more of a receiver, a transmitter, an antenna, a modem, a port, or other suitable components.

The navigational device 210 can exchange data with one or more servers 230 over the network 250 via network interface 222. Server 230 can be any suitable form of server or other computing device configured to supply navigational device 210 with the appropriate information. In particular, in some implementations, multiple servers are accessed in a sequence or in parallel by navigational device 210 to retrieve or obtain the desired information or functionality.

Similar to navigational device 210, server 230 can include a processor(s) 232, a memory 234, and a network interface 238. The memory 234 can store information accessible by processor(s) 232, including instructions 236 that can be executed by processor(s) and data.

Server 230 can include or be in communication with one or more databases, including a traffic database 240 and/or a geographic information system 242. Server 230 can access databases 240 and 242 over a LAN, WAN, or other suitable computing construct.

Traffic database 240 can store or provide data describing real-time or daily traffic conditions. For example, traffic database 240 can provide data describing the locations of any current traffic stoppages, congestions, or other traffic conditions.

Geographic information system 242 can store or provide geographic data, including map data, point of interest data, road categorization data, or other suitable data. In some implementations, server 230 can use data obtained from geographic information system 242 to determine and provide navigational instructions from an origin to a destination.

The network 250 can be any type of communications network, such as a local area network (e.g. intranet), wide area network (e.g. Internet), or some combination thereof. In general, communication between the navigational device 210 and server 230 can be carried via network interface using any type of wired and/or wireless connection, using a variety of communication protocols (e.g. TCP/IP, HTTP), encodings or formats (e.g. HTML, XML), and/or protection schemes (e.g. VPN, secure HTTP, SSL).

Figure 3:
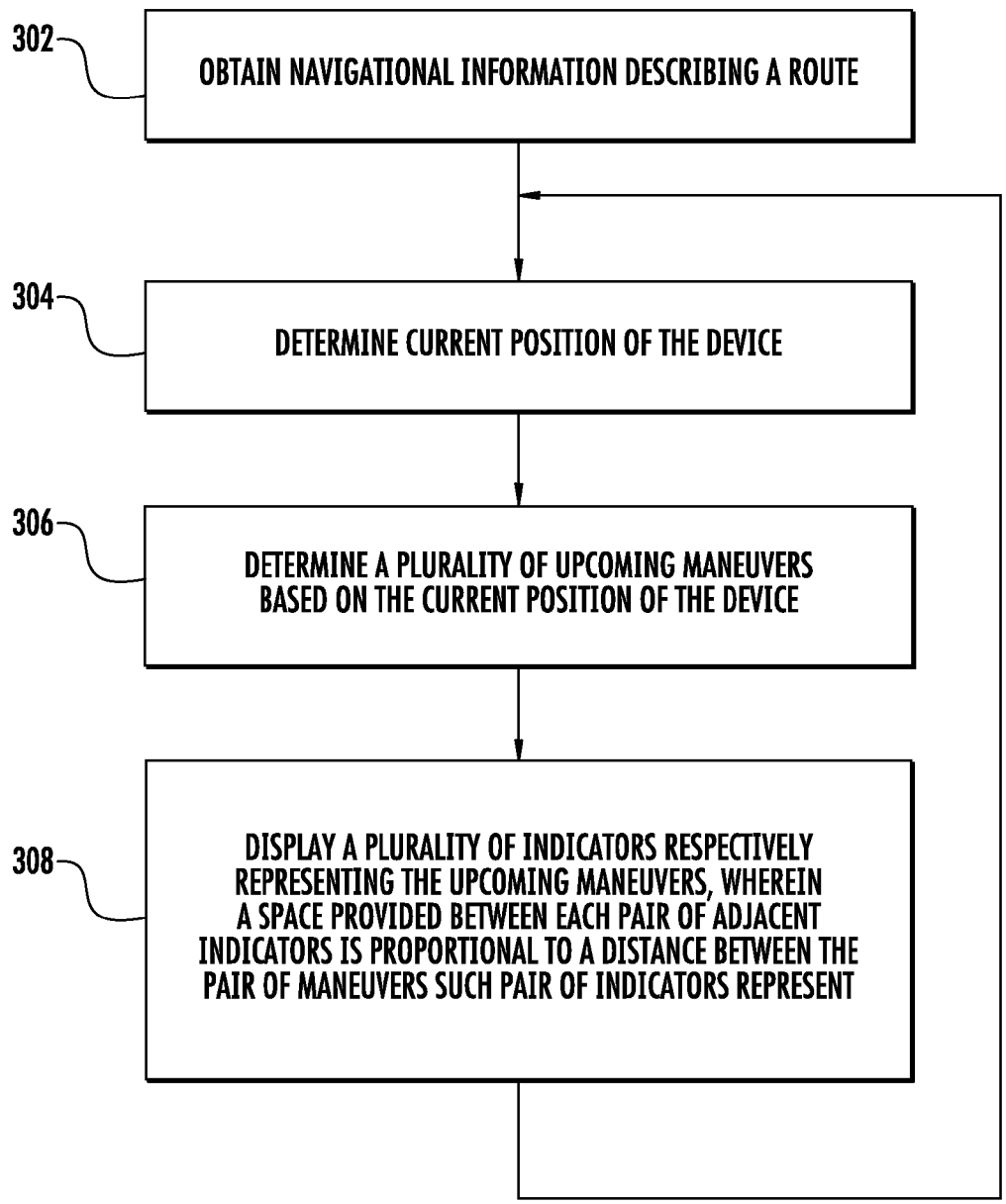
FIG. 3 depicts a flow chart of an example method for providing navigational instruction according to an example embodiment of the present disclosure.

FIG. 3 depicts a flow chart of an example method (300) for providing navigational instruction according to an example embodiment of the present disclosure. Although method (300) will be discussed with reference to system 200 of FIG. 2, method (300) can be performed by any suitable computing system.

In addition, FIG. 3 depicts steps performed in a particular order for purposes of illustration and discussion. Those of ordinary skill in the art, using the disclosures provided herein, will understand that the various steps of method (300) can be omitted, adapted, and/or rearranged in various ways without departing from the scope of the present disclosure.

At (302) navigational information describing a route can be obtained. For example, navigational device 210 can communicate with server 230 over network 250 to receive navigation information describing a plurality of navigational maneuvers to be performed according to a route. Example navigational maneuvers can include driving or walking maneuvers such as "turn right", transit maneuvers such as "board the southbound L-Train", or other suitable forms of navigational maneuvers.

At (304) a current position of the device can be determined. For example, navigational device 210 can operate positioning system 220 to determine a current position of the device 210.

At (306) a plurality of upcoming maneuvers can be determined based on the current position of the device. As an example, navigational device 210 can analyze the current position of the device relative to the route so as to identify the next upcoming navigational maneuvers. For example, in some implementations, the next three anticipated maneuvers can be identified at (306).

As another example, in some implementations, at (306) the navigational device 210 can identify both the current position and speed of the device or device user. Based on such information, the device can determine at (306) which of the sequence of navigational maneuvers the user is expected to reach within a threshold amount of time.

As another example, at (306) the navigational device 210 can receive data from server 230 that identifies the plurality of upcoming maneuvers. In particular, the device 210 can report its current location and/or speed to server 230 and server 230 can, in turn, provide the navigational device with data identifying the upcoming maneuvers. For example, the data from the server 230 can identify the plurality of upcoming maneuvers along with a plurality of distances respectively associated with the upcoming maneuvers. The navigational device 210 can then use such information to determine the appropriate presentation of the upcoming maneuvers at (308).

As yet another example, in some implementations, the data received at (306) from the server 230 can include a listing of upcoming maneuvers and associated distances or spacings along with a style sheet. The device 210 can then apply the style sheet to the provided listing at (308). As another example, at (306) the server 230 can provide the navigational device 210 with a web page or other data structure in which the upcoming maneuvers are already organized (e.g. spaced according to distance) for display.

At (308) a plurality of indicators respectively representing the upcoming maneuvers determined at (306) can be displayed on a user interface. A space provided between each pair of adjacent indicators can be proportional to a distance between the pair of maneuvers such pair of indicators represent.

As an example, in some implementations, at (308) the indicators can be displayed at different positions along a first axis of the user interface that is representative of distance (e.g. physical distance, driving distance, travel time, current expected travel time, etc.). For example, the first axis can be the y-axis of the user interface.

The interval or space between each pair of adjacent indicators can be proportional to the distance between the pair of maneuvers such pair of indicators represent. For example, the distance can be a physical distance between the locations respectively associated with the pair of navigational maneuvers. As another example, the distance can be a driving distance (e.g. the distance that a car must travel along one or more roadways).

As yet another example, the distance between each pair of navigational maneuvers can be a travel time such as, for example, an average travel time between the locations respectively associated with the pair of navigational maneuvers. As another example, the distance between each pair of navigational maneuvers can be a current expected travel time that incorporates real-time information concerning traffic conditions, weather conditions, current device speed, or other factors.

After (308), method (300) can return to (304) and re-determine the current position of the device. In such fashion, the navigational device 210 can periodically determine its position relative to the route and update the user interface accordingly. Alternatively or additionally, the navigational device 210 can periodically communicate with the server 230 to receive additional information, refresh a web page, or otherwise update the display of upcoming maneuvers.

As an example of periodic updates, in some implementations, the device can scroll the displayed indicators along the distance axis as the user progresses along the route (e.g. scrolled upwards when the indicators are presented along the y-axis with the next maneuver shown at the top).

Thus, indicators representing maneuvers that the user is newly approaching can be presented in a fashion which visually simulates the indicator moving onto the bottom of the display area from previously being below the display area and out of sight. In such fashion, the user can be given the impression that the device display area is virtually scrolling through the entire sequence of indicators so as to display only the most relevant upcoming indicators.

Figure 4:
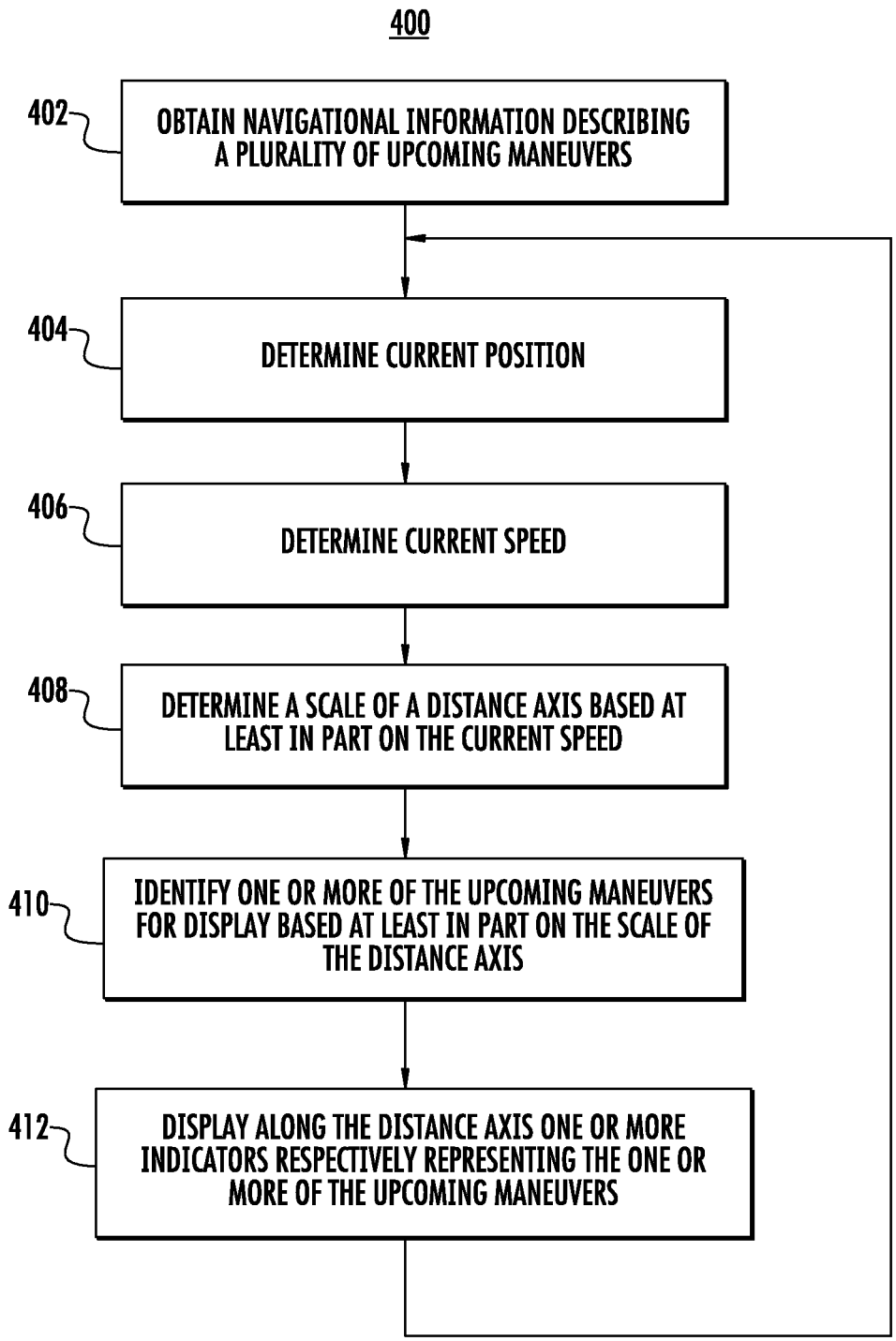
FIG. 4 depicts a flow chart of an example method for providing navigational instruction according to an example embodiment of the present disclosure.

FIG. 4 depicts a flow chart of an example method (400) for providing navigational instruction according to an example embodiment of the present disclosure. Although method (400) will be discussed with reference to system 200 of FIG. 2, method (400) can be performed by any suitable computing system.

In addition, FIG. 4 depicts steps performed in a particular order for purposes of illustration and discussion. Those of ordinary skill in the art, using the disclosures provided herein, will understand that the various steps of method (400) can be omitted, adapted, and/or rearranged in various ways without departing from the scope of the present disclosure.

At (402) navigational information describing a route can be obtained. For example, navigational device 210 can communicate with server 230 over network 250 to receive navigation information describing a plurality of navigational maneuvers to be performed according to a route.

At (404) a current position of the device can be determined. For example, navigational device 210 can operate positioning system 220 to determine a current position of the device 210.

At (406) a current speed of the device can be determined. For example, at (406) navigational device 210 can compare recent position determinations to determine a speed and a heading. As another example, navigational device 210 can receive data input from other devices or components that identify the current speed of the device.

At (408) a scale of a distance axis of a user interface can be determined based at least in part on the current speed. For example, the scale of the distance axis can decrease (e.g. show a smaller amount of distance over the same display space) when the speed is smaller and increase (e.g. show a larger amount of distance over the same display space) when the speed is greater.

As an example, in some implementations, the navigational device can determine the scale of the distance axis at (408) based at least in part on the current speed. As another example, in some implementations, the server 230 can determine the scale of the distance axis at (408) based at least in part on the current speed and communicate such information to the navigational device 210.

At (410) one or more upcoming maneuvers can be identified for display based at least in part on the scale of the distance axis. Thus, for example, navigational device 210 can consider the scale of the distance axis as determined at (408) with respect to the available display space of display 218. Thus, given the scale of the distance axis, navigational device 210 can determine at (410) which of the upcoming navigational maneuvers should be displayed in the display area of display 218.

As another example, at (410) the server 230 can identify the one or more upcoming maneuvers for display based at least in part on the scale of the distance axis and then communicate such information to the navigational device 210. For example, the data communicated by the server 230 can include the plurality of maneuvers along with distances or spacings in a style sheet. As another example, the data communicated by the server 230 can be a web page or other data structure in which the upcoming maneuvers are already spaced for display according to the scale of the distance axis determined at (408).

At (412) one or more indicators respectively representing the one or more upcoming maneuvers identified at (410) can be displayed along the distance axis at positions corresponding to their distance from the navigational device.

After (412) method (400) can return to (404) and re-determine the current position of the device. In such fashion, the navigational device 210 can periodically adjust the scale of the distance axis of the user interface based on the current speed of the device or the device user. The device 210 can then determine which upcoming maneuvers should be indicated in the user interface display area based on the scale of the distance axis and the respective distances associated with the upcoming maneuvers.

Therefore, only indicators for those maneuvers that are expected to be reached within a navigationally-significant period of time, as determined by the current speed of the device, will be displayed. Further, the space between the indicators will be proportional to their respective distances from one another, as they will be positioned along the distance axis according their respective distances.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

Furthermore, computing tasks discussed herein as being performed at a server can instead be performed at a client device (e.g. navigational device communicating with a server). Likewise, computing tasks discussed herein as being performed at the client device can instead be performed at the server.

While the present subject matter has been described in detail with respect to specific example embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for providing navigational instruction, the method comprising:
   obtaining, by one or more computing devices, navigational information describing a sequence of navigational maneuvers associated with a route;
   determining, by the one or more computing devices, a distance between each navigational maneuver and the previous sequential navigational maneuver;
   determining, by the one or more computing devices, a current speed at which a user is travelling;
   identifying, by the one or more computing devices, which of the sequence of navigational maneuvers the user is expected to reach within a threshold amount of time based at least in part on the current speed at which the user is travelling; and
   displaying, by the one or more computing devices, a user interface providing a sequence of indicators respectively representing the sequence of navigational maneuvers, wherein the sequence of indicators provided in the user interface represent only the navigational maneuvers that the user is expected to reach within the threshold amount of time;
   wherein a space between each indicator and the previous sequential indicator is proportional to the distance between the navigational maneuver represented by such indicator and the navigational maneuver represented by the previous sequential indicator.

2. The method of claim 1, wherein the steps of determining the current speed and identifying which of the sequence of navigational maneuvers the user is expected to reach within a threshold amount of time are performed on a periodic basis such that the sequence of indicators provided on the user interface continuously represent only the navigational maneuvers that the user is expected to reach within the threshold amount of time.

3. The method of claim 1, further comprising:
   determining, by the one or more computing devices, when one of the sequence of navigational maneuvers has been performed; and
   removing from the user interface, by the one or more computing devices, the indicator representing the completed navigational maneuver when it is determined that such navigational maneuver has been performed.

4. The method of claim 1, wherein the sequence of indicators included in the user interface are presented at different positions along a first axis of the user interface that is representative of distance.

5. The method of claim 1, wherein the sequence of indicators comprises a sequence of graphical icons respectively describing the sequence of navigational maneuvers.

6. The method of claim 1, wherein the sequence of indicators comprises a sequence of textual entries respectively describing the sequence of navigational maneuvers.

7. The method of claim 1, wherein the distance between each navigational maneuver and the previous sequential navigational maneuver comprises a driving distance associated with the route.

8. The method of claim 1, wherein the distance between each navigational maneuver and the previous sequential navigational maneuver comprises a travel time associated with the route.

9. The method of claim 1, wherein the distance between each navigational maneuver and the previous sequential navigational maneuver comprises a current expected travel time determined based at least in part on the route and traffic data.

10. A device comprising:
    a processor;
    a memory;
    a positioning system; and
    a display;
    wherein the memory stores instructions that, when executed by the processor, cause the device to perform operations, the operations comprising:
        obtaining navigational information describing a route;
        determining a current position of the device;
        determining a plurality of upcoming maneuvers based at least in part on the navigational information and the current position of the device, wherein determining the plurality of upcoming maneuvers based at least in part on the navigational information and the current position of the device comprises:
            determining a current speed at which the device is travelling; and
            identifying a plurality of expected maneuvers that the device will reach within a threshold amount of time based at least in part on the navigational information, the current position of the device, and the current speed at which the device is travelling; and
        providing on the display a plurality of indicators respectively representing the plurality of expected maneuvers, wherein a space is provided between each pair of adjacent indicators, and wherein the space between each pair of adjacent indicators is proportional to a distance between the pair of maneuvers such pair of indicators represent.

11. The device of claim 10, wherein the distance between each pair of maneuvers comprises a driving distance.

12. The device of claim 10, wherein the distance between each pair of maneuvers comprises a travel time.

13. The device of claim 10, wherein the distance between each pair of maneuvers comprises a current expected travel time based at least in part on the route and obtained traffic data.

14. The device of claim 10, wherein the plurality of indicators comprises one of a plurality of graphical icons or a plurality of textual entries.

15. The device of claim 10, wherein:
    providing on the display the plurality of indicators respectively representing the plurality of upcoming maneuvers comprises providing on the display the plurality of indicators at a plurality of intervals along a y-axis of the display;
    the interval between each pair of adjacent indicators is proportional to the distance between the pair of maneuvers such pair of indicators represent; and
    the memory stores further instructions that, when executed by the processor, cause the device to perform further operations, the further operations comprising scrolling the plurality of indicators upwards along the y-axis based at least in part on the current position of the device.

16. A non-transitory computer-readable medium storing instructions that, when executed by one or more computing devices, cause the one or more computing devices to perform operations, the operations comprising:

obtaining navigational information describing a plurality of upcoming maneuvers, wherein a plurality of distances are respectively associated with the plurality of upcoming maneuvers;

determining a current position and a current speed;

determining a scale of a distance axis of a user interface based at least in part on the current speed;

identifying one or more of the upcoming maneuvers for display based at least in part on the scale of the distance axis and the plurality of distances respectively associated with the plurality of upcoming maneuvers; and displaying, along the distance axis of the user interface, one or more indicators respectively representing the one or more of the upcoming maneuvers.

17. The non-transitory computer-readable medium of claim 16, wherein identifying one or more of the upcoming maneuvers for display based at least in part on the scale of the distance axis and the plurality of distances respectively associated with the plurality of upcoming maneuvers comprises identifying one or more of the upcoming maneuvers for display based at least in part on the current position, the scale of the distance axis, and the plurality of distances respectively associated with the plurality of upcoming maneuvers.

18. The non-transitory computer-readable medium of claim 16, wherein:

the distance axis comprises a y-axis of the user interface;

the non-transitory computer-readable medium stores further instructions for performing further operations comprising scrolling the y-axis upwards as the plurality of upcoming maneuvers are performed.

19. The method of claim 6, wherein the user interface does not include a map or other graphical representation of the route.

20. The non-transitory computer-readable of claim 16, wherein displaying, along the distance axis of the user interface, one or more indicators respectively representing the one or more of the upcoming maneuvers comprises displaying the one or more indicators along the distance axis of the user interface at respective positions that respectively correspond to the respective distances of the upcoming maneuvers from the current position.

\* \* \* \* \*